Feb. 18, 1969     D. A. CLARK     3,428,335

LIFT HITCH ASSEMBLY

Filed March 8, 1967

INVENTOR.
DAVID A. CLARK

BY

*Re Zimmerman*

ATTORNEY

United States Patent Office 3,428,335
Patented Feb. 18, 1969

3,428,335
LIFT HITCH ASSEMBLY
David A. Clark, P.O. Box 396,
Sand Springs, Okla. 74063
Filed Mar. 8, 1967, Ser. No. 621,700
U.S. Cl. 280—479                                       4 Claims
Int. Cl. B60d *1/10;* B60p *3/22;* A01b *51/00*

ABSTRACT OF THE DISCLOSURE

A mechanical device which is a component of a tank-carrying vehicle. The mechanical device being an improved means for connecting tool bars equipped with agricultural equipment to the tank-carrying vehicle.

---

The present invention offers an easy, simplified means for connecting all types of farming esuipment having a transverse bar moving in tandem to a tank-carrying vehicle. In operation, the tank vehicle itself is connected to a power tractor by means of a pin connection. The new and improved lift hitch assembly is useful for attaching farm equipment having standard SAE three-point hitch connections as a component in the farm equipment supporting structure. The reference to an SAE three-point hitch connection is used as illustration only and not as a limitation in the use of this device.

The object of this invention is to provide a system for hitching agricultural equipment to a vehicle so as to provide a hitch on a tank vehicle which is compatible with equipment having an SAE three-point hitch connection.

Another object of this invention is to provide easy adjustable means for lowering and raising the transverse member of tool bar implements which are to be attached.

Still another object of this invention is to provide means for attaching equipment in such a manner as to control and make more uniform the depth setting of the pre-planting equipment.

Figure 1:
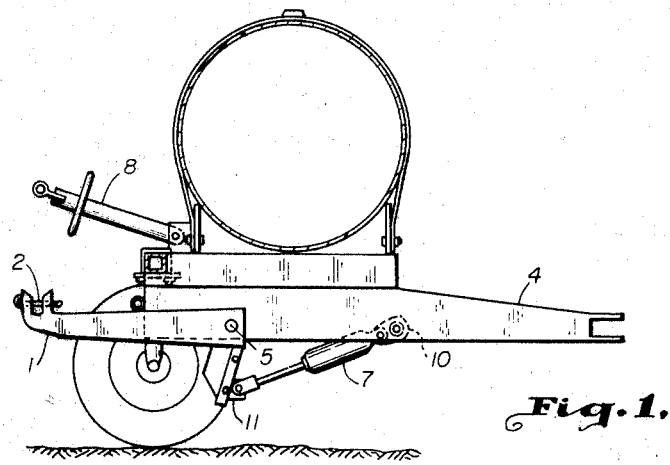
FIGURE 1 illustrates a sectional view of a side elevation of the lift hitch assembly attached to a tank-carrier vehicle in a towing position.

Reference is made to FIGURE 1 in which is shown a side view of the lift hitch assembly in combination with the tank vehicle. The lift arm 1 has means 2 for securing a transverse supporting member (not shown) of the agricultural equipment which is to be attached. The lift arms which are made from heavy bar material are attached to a movable torque bar member 3 (FIGURE 2) at point 5 (FIGURE 1). The torque bar member to which the lift arms are attached is shown as 3, FIGURE 2. The torque bar member is enclosed in a circular pipe which passes through the metal supporting structural channels 4 as shown in FIGURE 1 and 4 as shown in FIGURE 3.

Figures 2, 4:
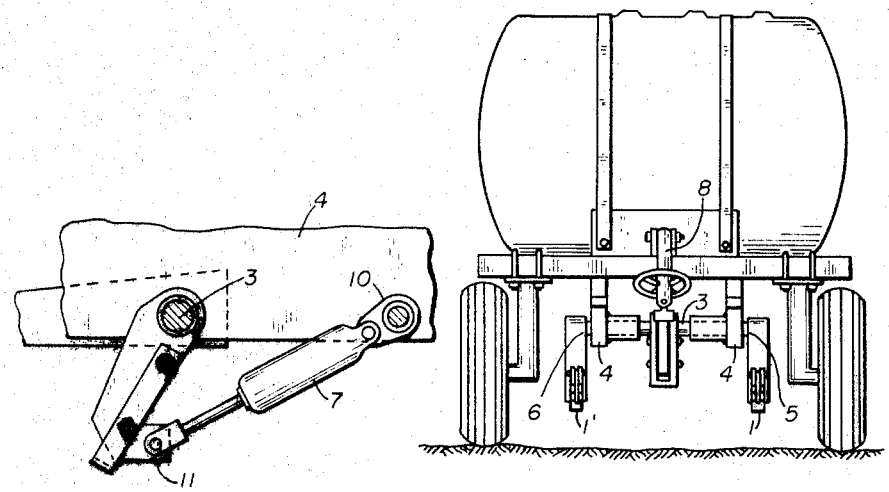
FIGURE 2 illustrates a rear view showing the lift hitch assembly as it appears from the rear of the tank carrier in a lowered position.
FIGURE 4 shows a sectional view of the mechanical linkage and the hydraulic cylinder attached to the supporting frame.

Reference is made to FIGURE 2, which is a back view of the lift hitch assembly. The torque bar member located inside a metal pipe referred to in the preceding paragraph is shown as 3 and extends through the metal pipe and the structural members of the vehicle 4 (FIGURE 1 and FIGURE 3). The lifting arms of the hoist assembly are shown as 1 and 1'. Both of these lifting arms are attached to the torque bar member 3 at 5 and 6 so as to move in an up-and-down direction when the torque bar member rotates in a semicircular direction. The lifting arms are shown in a down position between and forward of the vehicle wheel assembly. The positioning of the lifting arms on the vehicle frame is critical only to the extent of establishing a balance between the vehicle and the agricultural equipment being pulled in tandem so as to provide good mobility. Also, by locating the lifting arms as shown, the agricultural equipment being pulled is positioned close to the rear wheels of the tank vehicle. This affords a closer control on the equipment being towed and enables the operator to turn in a reverse direction within a very short turn. This fine control can only be accomplished by attaching the hitch assembly to the vehicle in this manner. The use of my lift hitch assembly also enables the operator to easily adjust the height of the tool bar to which the agricultural equipment is attached. By adjusting the height of the tool bar, the depth at which the applicator or shank penetrates the soil can be set and the level or depth at which ammonia which is applied through the applicator is fed into the soil can be selected.

Both FIGURE 1 and FIGURE 2 show an adjustable linkage 8 which is used as a connector for the top of an SAE hitch for the agricultural equipment. This adds extra rigidity between the tank vehicle and the connected equipment. To prevent the transverse member or tool bar of the agricultural equipment, whichever is being used, from raising off of the lifting arms 1 and 1', a safety locking device 2 is provided.

Figure 3:
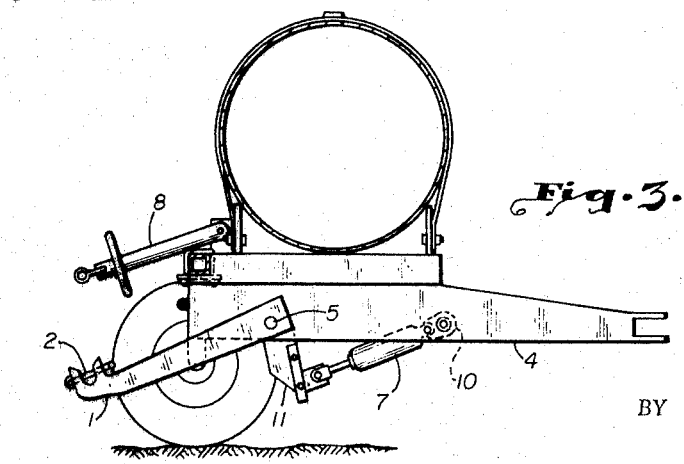
FIGURE 3 illustrates a side view of the lift hitch assembly in a lowered position.

FIGURE 4 illustrates the hydraulic means 7 for actuating the torque bar member 3 which is aligned and connected to the mechanical linkage 11 as shown in FIGURE 4 and rigidly affixed to a metal bar or pipe at 10 (FIGURE 3) suspended between the structural channels 4 (FIGURE 1 and FIGURE 3). The hydraulic means shown as 7 (FIGURE 4) is operated remotely by the hand levers placed in a convenient place on the tractor for the operator. The amount of travel of the hydraulic cylinder 7 can be pre-set by the operator so as to control the distance of travel of the lifting arms.

This improved lift hitch assembly is used to connect an agricultural tool bar assembly or any similar equipment having a transverse bar assembly to a tank vehicle in tandem. In the preferred embodiment, the lift hitch assembly is attached to approximately parallel channel members in the supporting frame structure of a tank vehicle at points which give good balance and easy operation in field applications. The lift hitch assembly comprises two laterally spaced arms 1, FIG. 1 which are pivotally mounted and attached to the ends of a torque bar member 3, FIG. 4 in a tube passing through both of the structural channel members in the supporting frame structure 4 FIG. 1. Each of the lift arms 1, FIG. 1 are provided with slots in each of their free extremities and means in these slots for supporting in a locked position farm equipment assembly having a transverse bar. A third means of connecting is provided by an adjustable linkage 8, FIG. 1 attached to the rear frame structure of the vehicle. This adjustable linkage offers added rigidity when connected between the tool bar and the vehicle. This third means of connecting attached to the upper segment of the connections found on the supporting transverse member of the farm equipment assembly which is to be attached to the tank vehicle. Another unique feature is the positioning of the lateral lifting arms inside and in front of the wheels of the tank-carrying vehicle note FIG. 1. The positioning of the lateral spaced lifting arms adds balance and maneuverability to the vehicle. The torque bar member to which the lateral lifting arms are attached is actuated by mechanical linkage 11, FIG. 4 attached to the torque bar member. The mechanical linkage is connected to a hydraulic cylinder 7, FIG. 4 which when actuated causes the torque bar member 3, FIG. 4 to move in a semi-circular direction. The amount of movement of the torque bar member is regulated by adjustable stops in the hydraulic cylinder assembly which is located between and below the metallic structural supporting sections 4, FIG. 4 of the vehicle. The directional movement of the hydraulic cylinder 7, FIG. 4 is controlled by operating levers (not shown) conveniently located near the operator of the hydraulic pump motor equipped power tractor which is used to pull the vehicle and the attached agricultural implements in tandem. Previously, in soil preparation a different type of hitch was required when changing various types of agricultural equipment in the field operations. The use of my new lift hitch assembly adds flexibility and decreases the need for extra equipment required in conditioning soil for growing, as well as providing easier hook-up of various agricultural machinery. This new type of lift hitch assembly to be used in combination with a tank vehicle is easily attached to bar assemblies or other agricultural machinery equipped with an SAE connection. With this new type of hitch, it is now possible to use the vehicle not only as a platform for carrying a tank of anhydrous ammonia, but also for attaching other agricultural assemblies for tilling or side dressing soil. The use of this particular hitch allows the same tool bar with agricultural equipment attached to be removed from the tank vehicle in the field and attached directly to a standard three-point hitch tractor.

It will, of course, be understood that various details of construction may be varied through a wide range without departing from the principles of this invention.

I claim:

1. In combination with a vehicle having a rear pair of wheels, and approximately opposite channels in a supporting frame structure, a lift arm assembly comprising one adjustable upper linkage, a pair of spaced lower lifting arms, a torque bar member, mechanical linkage means and hydraulic means, the said adjustable upper linkage being pivotally attached to the upper structure of the said supporting frame structure, each of the said spaced lower lifting arms being attached to the opposite ends of the said torque bar member, the said torque bar member being positioned in front of the rear axle of the said vehicle and rotatably mounted in the said opposite structural channels, the said torque bar member being actuated through the said mechanical linkage means by hydraulic means secured to the said supporting frame structure.

2. The lift hitch assembly as claimed in claim 1 wherein the said pair of lifting arms each have a slotted section in the free extremities with means in each of the said slotted sections to receive and lock securely in place a connecting member of agricultural equipment.

3. The lift arm assembly as claimed in claim 2 wherein the said locking means of the said slotted sections of the said lifting arms is a removable pin passing through the inner and outer walls of the said slotted sections.

4. The lift arm assembly as claimed in claim 1 wherein the said pair of lifting arms attached to the end of the said torque bar member are mounted so as to pass inside the said pair of wheels, and one end of the said mechanical linkage is connected approximately at the midpoint of the said torque bar member and the other end of the said mechanical linkage is connected to the said hydraulic means, the said hydraulic means being remotely controlled.

References Cited

UNITED STATES PATENTS

| | | | |
|---|---|---|---|
| 3,048,228 | 8/1962 | Hess | 172—272 |
| 3,065,977 | 11/1962 | Virtue | 280—460 |
| 3,172,686 | 3/1965 | Beard | 280—461 |
| 2,445,145 | 7/1948 | Love | 172—443 X |
| 2,691,932 | 10/1954 | Sawyer et al. | 172—272 |
| 2,842,077 | 7/1958 | Morrison | 111—7 |
| 2,842,899 | 7/1958 | Padrick | 111—7 |
| 3,078,930 | 2/1963 | Foote | 172—491 |

OTHER REFERENCES

Wehsely, German printed application No. 1,198,602, published Aug. 11, 1964.

LEO FRIAGLIA, *Primary Examiner.*

U.S. Cl. X.R.

280—5; 172—272; 111—7